US012705679B2

(12) United States Patent
Hsu et al.

(10) Patent No.: US 12,705,679 B2
(45) Date of Patent: Aug. 11, 2026

(54) MACHINE LEARNING MODELS FOR PATENT VALUATION

(71) Applicants: The Trustees of the University of Pennsylvania, Philadelphia, PA (US); Carnegie Mellon University, Pittsburgh, PA (US)

(72) Inventors: David Hwei-Yu Hsu, Philadelphia, PA (US); Prasanna Tambe, Wynnewood, PA (US); Dokyun Lee, Englewood Cliffs, NJ (US)

(73) Assignees: The Trustees of the University of Pennsylvania, Philadelphia, PA (US); Carnegie Mellon University, Pittsburgh, PA (US)

( * ) Notice: Subject to any disclaimer, the term of this patent is extended or adjusted under 35 U.S.C. 154(b) by 430 days.

(21) Appl. No.: 18/091,208

(22) Filed: Dec. 29, 2022

(65) Prior Publication Data

US 2024/0037683 A1 Feb. 1, 2024

Related U.S. Application Data

(60) Provisional application No. 63/294,950, filed on Dec. 30, 2021.

(51) Int. Cl.
*G06Q 30/00* (2023.01)
*G06N 3/0442* (2023.01)
(Continued)

(52) U.S. Cl.
CPC ......... *G06Q 50/184* (2013.01); *G06N 3/0442* (2023.01); *G06N 3/0464* (2023.01); *G06N 3/08* (2013.01)

(58) Field of Classification Search
CPC ...... G06N 3/0442; G06N 3/0464; G06N 3/08; G06N 3/045; G06N 3/09
See application file for complete search history.

(56) References Cited

U.S. PATENT DOCUMENTS 7,657,476 B2 * 2/2010 Barney .................. G06Q 40/00 705/36 R
7,840,460 B2 * 11/2010 Williams .............. G06Q 40/00 705/36 R
(Continued)

FOREIGN PATENT DOCUMENTS

KR 101255181 B1 4/2013
KR 2013/0125119 A 11/2013
(Continued)

OTHER PUBLICATIONS

Hsu, David H., and Rosemarie H. Ziedonis. "Resources as dual sources of advantage: Implications for valuing entrepreneurial-firm patents." Strategic Management Journal 34.7 (2013): 761-781. (Year: 2013).*
(Continued)

*Primary Examiner* — Luis A Brown
(74) *Attorney, Agent, or Firm* — Jenkins, Taylor & Hunt, P.A.

(57) ABSTRACT

Methods, systems, and computer readable media for using machine learning models to determine predicted values of patent documents. In some examples, a method includes training, by at least one processor, a machine learning model to predict patent value based on unstructured text from training patents and, for each training patent, a measure of patent value. The method includes supplying, by the at least one processor, unstructured text from a patent document to the machine learning model. The method includes output-
(Continued)

ting, by the at least one processor, a predicted measure of value of the patent document.

14 Claims, 6 Drawing Sheets

(51) Int. Cl.

| | |
|---|---|
| ***G06N 3/0464*** | (2023.01) |
| ***G06N 3/08*** | (2023.01) |
| ***G06Q 50/18*** | (2012.01) |

(56) References Cited

U.S. PATENT DOCUMENTS

| | | | | |
|---|---|---|---|---|
| 8,161,049 | B2 * | 4/2012 | Williams | G06Q 10/00 706/46 |
| 9,177,349 | B2 * | 11/2015 | Barney | G06Q 30/0202 |
| 9,251,243 | B2 * | 2/2016 | Stec | G06F 16/34 |
| 10,839,156 | B1 * | 11/2020 | Saxena | G06F 40/216 |
| 11,436,529 | B1 * | 9/2022 | Londeree | G06F 16/353 |
| 12,191,003 | B2 * | 1/2025 | Martin | G16C 20/30 |
| 2007/0294232 | A1 * | 12/2007 | Gibbs | G06Q 10/10 707/999.005 |
| 2017/0109848 | A1 * | 4/2017 | Bufe, III | G06F 16/90332 |
| 2018/0293678 | A1 * | 10/2018 | Shanahan | G06N 20/00 |
| 2020/0065384 | A1 * | 2/2020 | Costello | G06N 3/0442 |
| 2020/0226288 | A1 * | 7/2020 | Zhang | G06N 3/0499 |
| 2020/0257963 | A1 * | 8/2020 | Abhinav | G06N 5/045 |
| 2021/0034707 | A1 * | 2/2021 | Podgorny | G06F 40/30 |
| 2021/0157983 | A1 * | 5/2021 | Kalluri | G06F 40/216 |
| 2021/0240334 | A1 * | 8/2021 | Brockman | G06F 3/04842 |
| 2021/0360001 | A1 * | 11/2021 | Proper | G06V 10/762 |
| 2022/0188950 | A1 * | 6/2022 | Gschwendtner | G06N 20/00 |
| 2022/0247866 | A1 * | 8/2022 | Xiao-Devins | H04M 3/5335 |

FOREIGN PATENT DOCUMENTS

| | | | | |
|---|---|---|---|---|
| KR | 101771634 | B1 | 9/2017 | |
| KR | 2018/0086084 | A | 7/2018 | |
| WO | WO 2014/092369 | A1 | 6/2014 | |
| WO | WO-2014135616 | A1 * | 9/2014 | G06Q 50/184 |

OTHER PUBLICATIONS

Hsu, David H., and Rosemarie H. Ziedonis. "Patents as quality signals for entrepreneurial ventures." Academy of management proceedings. vol. 2008. No. 1. Briarcliff Manor, NY 10510: Academy of Management, 2008. (Year: 2008).*

Hsu, David H., et al. "Benchmarking US university patent value and commercialization efforts: A new approach." Research Policy 50.1 (2021): 104076. (Year: 2021).*

Hall, Bronwyn H., Adam B. Jaffe, and Manuel Trajtenberg. "Market value and patent citations: A first look." (2000). (Year: 2000).*

Noh, Heeyong, and Sungjoo Lee. "Forecasting forward patent citations: comparison of citation-lag distribution, tobit regression, and deep learning approaches." IEEE Transactions on Engineering Management 69.4 (2020): 1185-1196. (Year: 2020).*

Kim, Mirae, and Youngjung Geum. "Predicting patent transactions using patent-based machine learning techniques." IEEE Access 8 (2020): 188833-188843. (Year: 2020).*

Eom, Haneul, Sungyun Choi, and Sang Ok Choi. "Marketable value estimation of patents using ensemble learning methodology: Focusing on US patents for the electricity sector." Plos one 16.9 (2021): e0257086. (Year: 2021).*

Chung, Park, and So Young Sohn. "Early detection of valuable patents using a deep learning model: Case of semiconductor industry." Technological Forecasting and Social Change 158 (2020): 120146. (Year: 2020).*

Abrams, D. S., Akcigit, U., & Grennan, J. (2013). Patent value and citations:Creative destruction or strategic disruption? (No. w19647). National Bureau of Economic Research.

Azoulay, P., Ding, W., & Stuart, T. (2007). The determinants of faculty patenting behavior: Demographics or opportunities?. Journal of Economic Behavior & Organization, 63(4), 599-623.

Bessen, J. (2008). The value of US patents by owner and patent characteristics.Research Policy, 3 7( 5), 932-945.

Bojanowski, P., Grave, E., Joulin, A., & Mikolov, T. (2017). Enriching word vectors with subword information. Transactions of the Association for ComputationalLinguistics, 5 , 135-146.

Cockburn, I., & Griliches, Z. (1988). Industry Effects and Appropriability Measures in the Stock Market's Valuation of R&D and Patents. The American Economic Review, 78(2), 419-423.

Cohen, W. (2010). "Fifty years of empirical studies of innovative activity and performance," in Handbook of the Economics of Innovation vol. 1, B. H. Hall and N. Rosenberg, eds., pp. 129-213.

Deng, Z., Lev, B., & Narin, F. (1999). Science and technology as predictors of stock performance. Financial Analysts Journal, 55(3), 20-32.

Devlin, J., Chang, M. W., Lee, K., & Toutanova, K. (2018). Bert: Pre-training of deep bidirectional transformers for language understanding. arXiv preprint arXiv:1810.04805.

Einav, L., & Levin, J. (2014). Economics in the age of big data. Science, 3 46(6210), 1243089.

Fitzgerald, T., Balsmeier, B., Fleming, L., & Manso, G. (2019). Innovation search strategy and predictable returns. Management Science, forthcoming.

Galasso, A., & Schankerman, M. (2010). Patent thickets, courts, and the market for innovation. The RAND Journal of Economics, 41(3), 472-503.

Galasso, A., Schankerman, M., & Serrano C. J. (2013). Trading and enforcing patent rights. The RAND Journal of Economics , 44(2), 275-312.

Gentzkow, M., Kelly, B., & Taddy, M. (2019). Text as data. Journal of Economic Literature, 5 7( 3), 535-74.

Griliches, Z. (1981). Market value, R&D, and patents. Economics Letters, 7, 183-167.

Griliches, Z. (1998). Patent statistics as economic indicators: A survey. In R &D and Productivity: The Econometric Evidence, Z. Griliches, editor, University of Chicago Press, 287-343.

Gentzkow, M., Shapiro, J. M., & Taddy, M. (2019). Measuring Group Differences in High-Dimensional Choices: Method and Application to Congressional Speech. Econometrica, 87( 4), 1307-1340.

Guellec, D., & de l a Potterie, B. V. P. (2000). Applications, grants and the value of patent. Economics letters, 6 9( 1), 109-114.

Hall, B. H., Jaffe, A. B., & Trajtenberg, M. (2001). The NBER patent citation data file: Lessons, insights and methodological tools (No. w8498). National Bureau of Economic Research.

Hall, B. H., Jaffe, A., & Trajtenberg, M. (2005). Market value and patent citations. RAND Journal of economics, 16-38.

Hansen, S., McMahon, M., & Prat, A. (2018). Transparency and deliberation within the FOMC: a computational linguistics approach. The Quarterly Journal of Economics, 1 33(2), 801-870.

Harhoff, D., Narin, F., Scherer, F. M., & Vopel, K. (1999). Citation frequency and the value of patented inventions. Review of Economics and Statistics, 8 1( 3), 511-515.

Harhoff, D., Scherer, F. M., Vopel, K. (2003). Citations, family size, opposition and the value of patent rights. Research Policy, 32(8): 1343-1363.

Hasan, M. A., Spangler, W. S., Griffin, T., & Alba, A. (Jun. 2009). Coa: Finding novel patents through text analysis. In Proceedings of the 15th ACM SIGKDD international conference on Knowledge discovery and data mining (pp. 1175-1184).

Hirshleifer, D., Hsu, P. H., & Li, D. (2013). Innovative efficiency and stock returns. Journal of Financial Economics, 107(3), 632-654.

Hirshleifer, D., Hsu, P. H., & Li, D. (2018). Innovative originality, profitability, and stock returns. The Review of Financial Studies, 31(7), 2553-2605.

Jaffe, A. B., Trajtenberg, M., Henderson, R. (1993). Geographic localization of knowledge spillovers as evidenced by patent citations, Quarterly Journal of Economics, 108(3), 577-598.

Kamien, M. I. & Schwartz, N. L. (1975). Market structure and innovation: A survey. Journal of Economic Literature 13, 1-37.

(56) References Cited

OTHER PUBLICATIONS

Kelly, B., Papanikolaou, D., Seru, A., & Taddy, M. (forthcoming). Measuring technological innovation over the long run. American Economic Review Insights.
Kogan, L., Papanikolaou, D., Seru, A., & Stoffman, N. (2017). Technological innovation, resource allocation, and growth. The Quarterly Journal of Economics, 1 32( 2), 665-712.
Kuhn, J. M. & Thompson, N. C. (2019). How to measure and draw causal inferences with patent scope. International Journal of the Economics of Business. 26(1), 5-38.
Lach, S., & Schankerman, M. (2008). Incentives and inventions in universities. The RAND Journal of Economics, 39(2), 403-433.
Lanjouw, J. O. (1998). Patent protection in the shadow of infringement: Simulation of patent value. The Review of Economic Studies, 65(4), 671-710.
Lanjouw, J. O., Pakes, A., Putnam, J. (1998). How to count patents and value intellectual property: the uses of patent renewal and application data. Journal of Industrial Economics, 46(4), 405-432.
Lerner, J. (1994). The importance of patent scope: an empirical analysis. The RAND Journal of Economics, 319-333.
Li, G. C., Lai, R., D'Amour, A., Doolin, D. M., Sun, Y., Torvik, V. I., . . . & Fleming, L. (2014). Disambiguation and co-authorship networks of the US patent inventor database (1975-2010). Research Policy, 43(6), 941-955.
Marco, A. C., Myers, A., Graham, S. J., D'Agostino, P., & Apple, K. (2015). The USPTO patent assignment dataset: Descriptions and analysis.
Pakes, A. (1985). On patents, R & D, and the stock market rate of return. Journal of Political Economy, 93(2), 390-409.
Peters, M. E., Neumann, M., Iyyer, M., Gardner, M., Clark, C., Lee, K., & Zettlemoyer, L. (2018). Deep contextualized word representations. arXiv preprint arXiv:1802.05365.
Pennington, J., Socher, R., & Manning, C. (Oct. 2014). Glove: Global vectors for word representation. In Proceedings of the 2014 conference on empirical methods in natural language processing (EMNLP) (pp. 1532-1543).
Reitzig, M. (2003). What determines patent value?: Insights from the semiconductor industry. Research Policy, 3 2( 1), 13-26.
Rücklé, A., Eger, S., Peyrard, M., & Gurevych, I. (2018). Concatenated power mean word embeddings as universal cross-lingual sentence representations. a rXiv preprint arXiv:1803.01400.
Sampat, B. N., & Ziedonis, A. A. (2004). Patent citations and the economic value of patents. In Handbook of quantitative science and technology research (pp. 277-298). Springer, Dordrecht.
Schankerman, M. (1998). How valuable is patent protection? Estimates by technology field. The RAND Journal of Economics, 29(1), 77-107.
Trajtenberg, M. (1990). A penny for your quotes: patent citations and the value of innovations. The Rand Journal of Economics, 21(1), 172-187.
Thursby, J. G., & Kemp, S. (2002). Growth and productive efficiency of university intellectual property licensing. Research Policy, 31(1), 109-124.
Thursby, J. G., & Thursby, M. C. (2002). Who is selling the ivory tower? Sources of growth in university licensing. Management Science, 48(1), 90-104.
Van Zeebroeck, N., & Van Pottelsberghe de la Potterie, B. (2011). The vulnerability of patent value determinants. Economics of nnovation and new technology, 20(3).
Ziedonis, R. H. (2004). Don't fence me in: Fragmented markets for technology and the patent acquisition strategies of firms. Management Science, 50(6), 804-820.

* cited by examiner

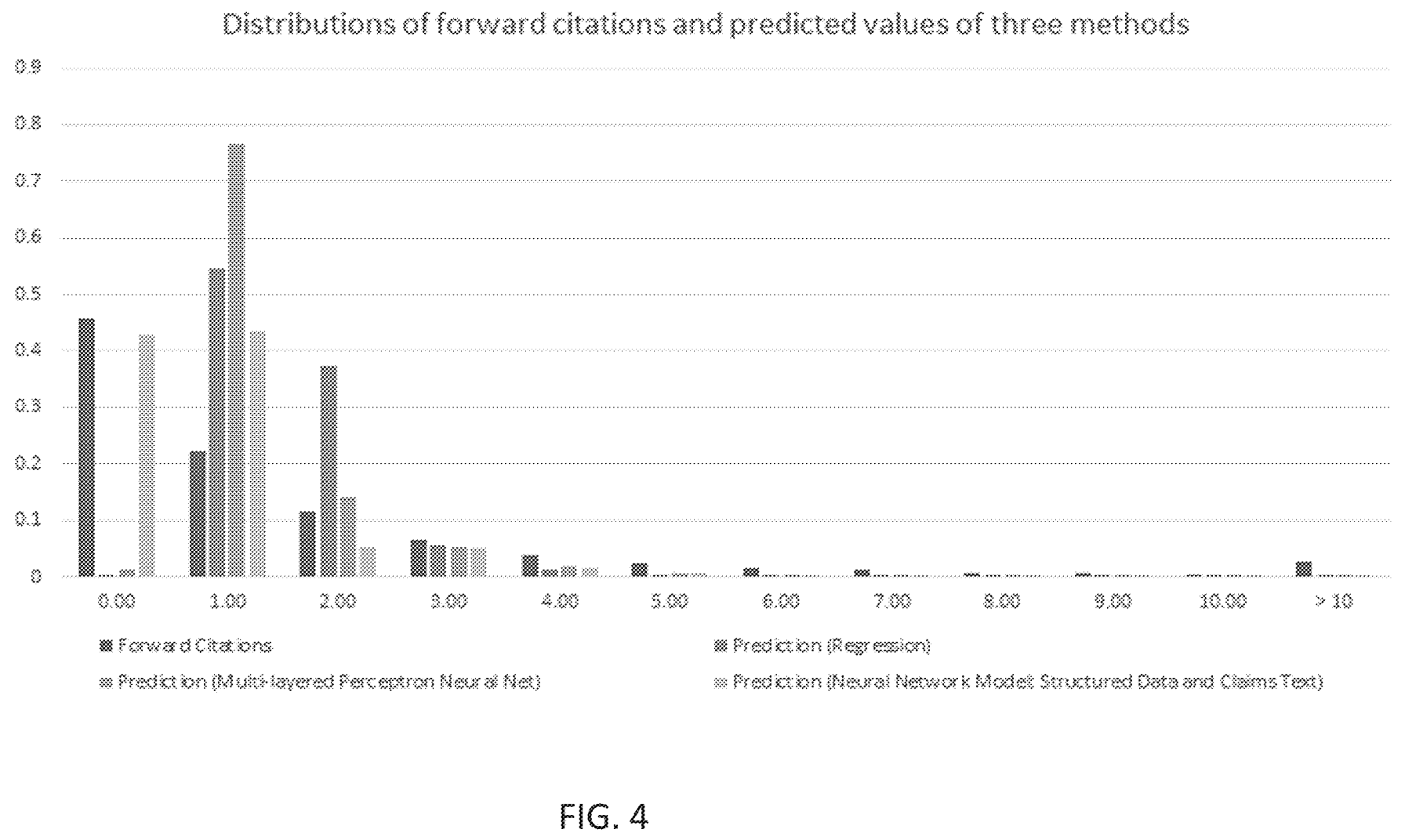

Distributions of forward citations and predicted values of three methods 0.9
0.8
0.7
0.6
0.5
0.4
0.3
0.2
0.1
0

0.00 1.00 2.00 3.00 4.00 5.00 6.00 7.00 8.00 9.00 10.00 > 10

Forward Citations
Prediction (Regression)
Prediction (Multi-layered Perceptron Neural Net)
Prediction (Neural Network Model: Structured Data and Claims Text)

FIG. 4

MACHINE LEARNING MODELS FOR PATENT VALUATION

PRIORITY CLAIM

This application claims the benefit of U.S. Provisional Patent Application Ser. No. 63/294,950, filed Dec. 30, 2021, the disclosure of which is incorporated herein by reference in its entirety.

TECHNICAL FIELD

The subject matter described herein relates generally to computer systems for deep learning and natural language processing (NLP). More particularly, the subject matter described herein relates to methods and systems for using deep learning and NLP for patent valuation.

BACKGROUND

Using patents to measure corporate innovation has been important for advancing scholarship in economics and business. Patent documents are valuable indicators of corporate innovation because they are thoroughly documented, standardized, and how they are constructed and recorded has legal implications. Over the past 50 years, academic analysis of patents has principally relied on structured information from the patent such as technology domain (e.g. biotech, semiconductors) (Lemer, 1994), assignees (Marco et al., 2015), citations (Harhoff et al., 1999), claims (Lemer, 1994), inventors (Li et al., 2014), location (Jaffe et al., 1993), and other standardized fields. Recent work has only begun to derive new information from the structured data (e.g. inventor ethnicity and diversity) to further advance measurement capabilities (Singh and Fleming, 2010).

Much of this interest has been focused on predicting the impact or value of patents. Studies have used traditional regression-based techniques, along with the structured features of patent data (scope, originality, classification, etc.) to estimate value (e.g. Lerner, 1994; Hirshleifer, Hsu, and Li, 2018). While forward patent citations are commonly used as a proxy for economic value in this literature (Trajtenberg, 1990), recent research has found that stock market reaction to firm patent grants is a superior correlate of firm growth than patent citations (Kogan et al, 2017). There is a pervasive empirical confound to observational studies, which is that patent value is typically observed in highly selected samples, such as upon (publicly-disclosed) patent licensing or litigation. Within the last decade, however, deep learning architectures have been shown to out-perform traditional methods for many prediction tasks, and especially those in which unstructured data can play a role. Deep learning allows algorithms to mimic what a human examination of the patent might reveal; it yields non-linear insights from the structured features, about how useful or valuable a patent might be, and it can perform the task at scale.

SUMMARY

Methods, systems, and computer readable media for using machine learning models to determine predicted values of patent documents. The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 4 shows histograms for the distribution of forward citations and the predicted values of three methods (linear regressions, neural networks without patent text, and neural networks with patent text);

DETAILED DESCRIPTION

Figure 1:
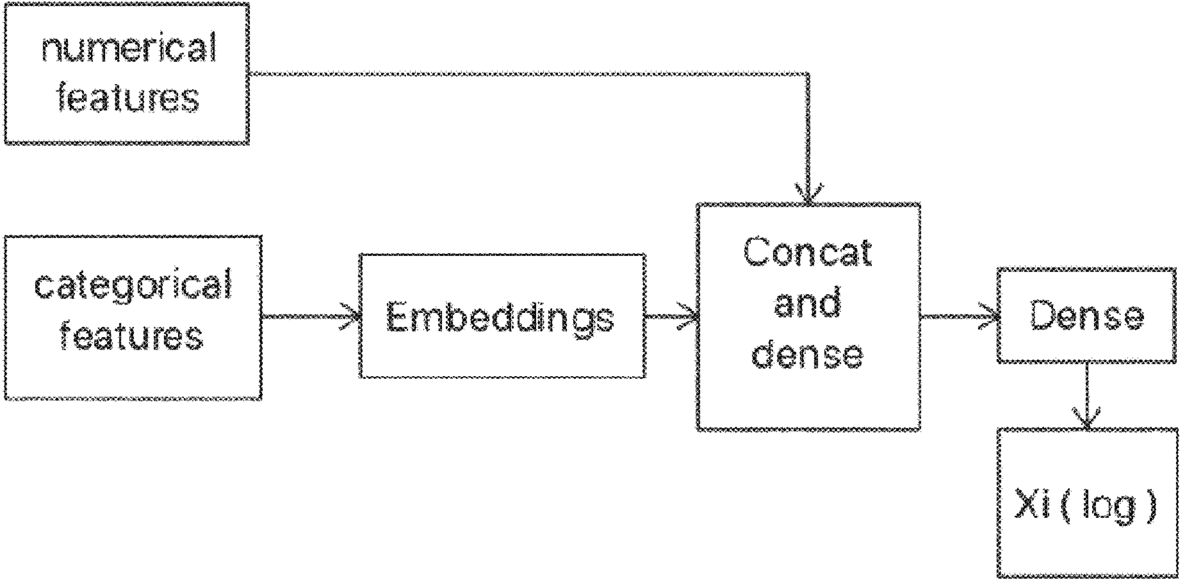
FIG. 1 is a block diagram illustrating an example method for constructing deep learning, neural network-based models.

Deep learning may be especially promising for patent analysis because the massive quantities of unstructured patent text have been under-utilized in the social science literature. Patent filings are rich textual documents that describe an innovation, its scope, important mechanisms, what it protects, and other important details. According to Trajtenberg (1990, p. 173): "It has long been thought that the detailed information contained in the patent documents may have a bearing on the importance of the innovations disclosed in them and that it may therefore be possible to construct patent indicators that could serve as proxies for the value of innovations." Although patent text has been available to researchers for decades, the scope and scale of the patent text have made it difficult to use for large-scale inferential analysis (there has been some limited work in the computer sciences literature, e.g. Hasan et al., 2009 and text analysis for social science insights is a rapidly expanding area, e.g. Gentzkow et al., 2019). There are millions of patents with thousands of words each and the language processing required to draw meaningful insights from patent-based text is demanding, not only because of its scale but also because of the sophistication of the language used in patent filings.

This specification describes the effectiveness of deep learning and natural language processing (NLP) in predicting patent value. Our deep learning models complement existing approaches, so to provide a baseline to evaluate their performance, we i) start with a linear regression model based on structured features, ii) test the performance of popular supervised machine learning models ("shallow" techniques) in which we provide the structured features such as Ridge regression, Random Forest, and XGBoost, and iii) use deep learning architectures as well as XGBoost (for comparison) that incorporate text. For the deep learning prediction task, we use three convolutional neural net (CNN) layers, with 100 filters each, and with kernel sizes of 2, 3 and 4 applied in parallel. These filters extract local-level features in text. A bidirectional long short-term memory (LSTM) network with a hidden-layer size of 256 then processes the sequential local-level textual features further, which is then passed to a multi-layer perceptron (dense) layer of size 256 with a ReLU (Rectified Linear Unit) activation function to produce the final patent representation. Finally, to predict the objective measure, we use an additional linear layer which takes the structured features and text representation as an input and outputs a single scalar value.

We use this deep learning architecture to predict economic value assigned by the market (the Kogan et al., 2017 measures) as well as the number of forward citations for the patent. The number of forward citations received by a patent has been regarded as an important indicator of patent quality (Office of Technology Assessment and Forecast, 1976; Trajtenberg, 1990; Harhoff, Narin, Scherer, and Vopel, 1999), which makes it a useful alternative measure of technological merit that we can use to examine the effectiveness of our methods. By showing that these methods also perform well in forecasting forward citations, we also hope to address the concern that our deep-learning methods work for patent value but not for other measures of technological merit.

A key advantage of this valuation method is that it is contemporaneous; it does not rely on data such as citations or market reactions that exist outside the context of the patent filing and that may take time to become available.

We make two key contributions. First, we evaluate the utility of deep learning and NLP methods for estimating patent value. These methods are evaluated against statistical methods that have been widely used in the literature. We compare several different approaches—regression, traditional supervised learning with and without text, and deep learning with text—to evaluate the incremental contribution of each for our ability to estimate patent value. It is also worth noting that we use the patent values calculated by Kogan et al. (2017) and the forward citation measures as our prediction targets for this exercise because of their wide use in the academic literature. Nevertheless, these methods can be applied to other objectives or value estimates (e.g., licensing fees and royalties, traded patent prices, etc.).

Second, we demonstrate that these methods can be used to effectively estimate values for patents that cannot be valued in any other way. Using these methods raises the accuracy of predictions by more than 46% in comparison with linear regression methods based on a rich set of patent and corporate features. Finally, the paper provides a number of descriptive statistics (such as skewness) on the distribution of patent value and forward citation in the existing historical patent portfolio. For example, numerous prior studies show that only a small set of patents are responsible for most of the overall value, and over 40% of granted U.S. patents are never cited (and so are inferred to be without value). However, such a statement is based on forward citations or some selected datasets of patent litigations, renewals, or licenses.

Literature Review

A group of prior studies examine patent valuation from the perspective of corporations, essentially imputing such value with the economic returns associated with the right to exclude in a particular domain. Taking advantage of corporate patenting and renewal data, Schankerman (1998) documents that the technology field, nationality of patent inventor, and patent application year are significant determinants of patent value. Ziedonis (2004) and Galasso and Schankerman (2010) find that the value of a patent is subject to its patent thicket, which is the fragmentation of patent rights measured by backward citations. As patent renewal and especially realized patent value is rarely observed, several papers use stock prices as instruments of market-perceived patent value. They show that R&D expenditure (Pakes, 1985; Cockburn and Griliches, 1988), backward citations of scientific studies (Deng et al., 1999), ratio of patents over R&D (Hall et al., 2005; Hirshleifer et al., 2013), diversity of backward citations (Hirshleifer et al., 2018), and innovation exploration or exploitation strategy (Fitzgerald et al., 2019) are factors that can affect patent value. Using the valuation of startup firms by venture capitalists as an instrument of patent value, Lemer (1994) shows the effect of patent scope, measured by the number of international patent classes (IPCs) in which a patent is assigned.

Some papers have also confirmed that ex post measures, such as future infringement and renewal (Lanjouw, 1998; Lanjouw, Pakes and Putnam, 1998; Harhoff, Scherer and Vopel, 2003), number of forward citations (Harhoff et al, 1999; Sampat and Ziedonis, 2005), and knowledge complementarity, measured by the ratio of forward non-self citations of a patent over forward non-self citations of all patents in a technology class (Galasso and Schankerman, 2010), are all associated with potential patent value. Finally, there are other ex post approaches to inferring patent value by examining patent rights reassignment in a market for intellectual property (Galasso, Schankerman and Serrano, 2013) and based on inventor surveys (e.g., Harhoff et al, 1999). A common denominator to all of the approaches listed in this section, however, is that there is a high degree of sample selection and data disclosure, likely drawing from the more valuable part of the patent value distribution.

A wholly separate literature from the patent and innovation work, but related to our efforts, is the rapidly-developing field of text-analytics and machine learning with economic data. More broadly, the revolution in "big data" has led many to argue that the availability of high-frequency, granular data at scale has the potential to revolutionize some fields of economic inquiry (Einav and Levin, 2014). This may be particularly true of unstructured data, such as images, sounds, and text that are not conveniently encoded in a format that they can be included in statistical models, but nevertheless have enormous amounts of information content. The increased use of deep learning models, in particular, has made it possible to derive valuable information from these volumes of unstructured data.

A number of economic studies have begun utilizing text and text analytics to develop new insights into economics and social science. Hansen et al (2018) use natural language processing to study the effects of transparency in communications on deliberations issued by the Federal Reserve. Gentzkow et al (2019) apply computational methods to congressional speech and find that partisanship has been growing over time. NLP techniques have also been used in the patent domain, and in the paper that is perhaps closest to ours, Kelly and co-authors (forthcoming) create a measure of patent importance from patent text similarity with existing patents and they identify "important" patents and show that the indices that they derive from them are able to capture waves of technological change over time. Raymond and Stem (2019) are also interested in predicting which patents will fall into the most selective tier of forward patent citations using textual data.

Key Data Sources and Measures

Patent Filings Data and Features

This analysis relies on several data sets. The first is the widely-used NBER patent database, which contains information on patents granted by the U.S. Patent and Trademark Office ("USPTO"). A patent is a property right granted to an inventor and is obtained by an inventor after filing a document with the USPTO. For use during the patent review process, this document includes all of the critical information about the patent, including the inventors, date of filing and date of grant, a description of the invention, what aspects of the invention should be protected by the patent, and other key fields. As such, these documents contain an enormous amount of information about R&D output and innovative activity that can be connected to specific organizations and individuals. Patent data and fields in the patent data can be viewed at https://www.patentsview.org/download/at the USPTO Patentsview database. These data are available for patents filed beginning in 1926.

Much of the research that uses patent data focuses on the question of whether it is possible to assess the impact of a patent (e.g. the number of times the patent is cited by later patents, a proxy for the economic value of the patent), given the information contained in the patent document, such as which technological subsection it is assigned to or the identity of the inventor or organization that filed the patent. Since we are mainly interested in predicting the impact of a patent, we only consider the information content of the patent that is known at its grant date (i.e., the date when the patent is officially assigned to its assignee).

The premise of this study is that most of the research in this area has used the structured patent fields to assess patent impact, i.e., categorical or numerical fields, such as references (backward citations), assignee name and type, inventor name, patent grant date, and technology classification. However, the unstructured textual data that comprise most of the patent are also available (for U.S. patents since 1976), drawn from different sections such as the patent summary, the claims, and the description of the patent. This text is a potentially useful and unexplored asset for prediction tasks. This analysis uses both the structured and unstructured data from the patent documents disclosed to the public upon grant dates.

The structured fields in the patent document that we use in the analysis are meant to reflect those used in the existing literature. We discuss all patent-level variables in the following groups.

a. Claims: Claims denote a series of statements that explicitly define the legal rights covered by a patent granted to the patenting organization. When courts adjudicate patent infringement cases, they only rely on claims. Thus, the descriptions of claims are very important to the patent owner in terms of both economic value and enforcement. A simple measure that has been used in prior research is the number of claims in the patent document (Lemer, 1994): more claims suggest greater coverage. Some research also analyzes the length of the first claim (Kuhn and Thompson, 2019): the shorter the first claim, the broader a patent covers, as shorter length suggests fewer qualifiers.

b. Technology classification: While there are a variety of different technology classification systems used across and within patent jurisdiction offices, we focus on the CPC (Cooperative Patent Classification system jointly developed by the European Patent Organization and the U.S. Patent & Trademark Office) subsection code, which consists of one letter digit and two number digits. One patent can be assigned to several subsection codes. In addition to positioning a patent in terms of technological property, we also consider another measure of patent scope, the number of different subsection codes to which a patent is assigned (e.g., Lerner, 1994).

c. Backward citations: A patent document includes a list of references inserted by applicants and patent examiners. This list includes prior patents, reports, or any documents that are closely related to the patent. Thus, the list can be regarded as the "paper trail" of knowledge sources used to develop the patent (Jaffe, Trajtenberg, and Fogarty, 2000) and provides rich information about the technological interconnections of different patents. A simple measure is the number of backward citations made. In addition, we include the number and ratio of backward citations to basic science (such as journal articles or technical reports) because patents based to a greater extent on basic science are more important (Trajtenberg et al., 1997; Fleming and Sorenson, 2004).

We also consider the duration of citations between the focal patent's grant year and cited patents' grant years, which reflects the life cycle length of a technology (Trajtenberg et al., 1997). Moreover, we consider if the backward citations made by a patent are new or old knowledge to the patent owner and construct measures for exploration and exploitation (Benner and Tushman, 2002) and depth and scope (Katila and Ahuja, 2002). Using the information about backward citations and technology classifications, we also construct a patent originality variable, which measures the breadth of different technology classifications covered by backward citations made by a focal patent (Trajtenberg, Henderson, and Jaffe, 1997; Hirshleifer et al., 2018). We also combine the information about backward citations and the ownership of prior patents covered by these backward citations to examine the number and ratio of self-citations that reflect the specificity and redeployability of a patent (Lanjouw and Shankerman, 2004; Hoetker and Agarwal, 2007; Marx, Strumsky, and Fleming, 2009) as well as patent thickets that reflect the diversified ownership of prior patents cited by the focal patent (e.g., Ziedonis, 2004).

d. Family: When a patent is filed to foreign patent offices, it will have a patent family identifier that indicates how many other offices have registered the focal patent. Prior work has shown that a patent that has been filed overseas is more valuable (e.g., Hsu, et al, 2020). In addition, the size of a patent family may also suggest the coverage of a bundle of patents.

e. Year of grant: The year in which the patent application was granted by the USPTO reflects when a patent owner receives legal protection for a patented technology.

f. Assignee: The USPTO also provides the information of the patent assignee. This field not only allows us to link patents to public firms, but also enables us to measure the patent thicket that reflects the fragmentation of patent ownership in commercialization of patents (Ziedonis, 2004).

Firm Features

In addition to structured data in the patent document, we also consider an extensive set of firm characteristics that have been shown to influence patent values in the existing literature. The first set is related to firms' financial and accounting variables and includes R&D expenditure, advertising expenditure, capital expenditure, market capitalization in logarithm, the market to book ratio that reflects a firm's market opportunities, the ratio of property, plant, and equipment (PPE) to total assets that reflects asset tangibility, firm age, the industry classification (SIC codes or Fama-French definitions), ROA, ROE, financial leverage, the ratio of cash flows to total debts that reflects a firm's liquidity, the ratio of cash holdings to total assets, industry concentration (i.e., the Herfindahl-Hirschman Index based on sales of all firms in one industry) that is an inverse indicator of industry competition, the number of employees, and firm age.

The second set is related to firms' patent portfolio characteristics and include the number of patents owned by a firm (i.e., patent portfolio size, see Galasso, Schankerman, and Serrano, 2013), the originality score based on all patents granted to the firm, the number of inventors, the duration of backward citations of the firm's patent portfolio, the number of different technology classifications covered by patents of the firm that reflects the breadth of the firm's patent portfolio, the number and ratio of backward citations to basic science of the firm's patent portfolio, the originality, exploration, exploitation, self-citation, scope, and depth of a firm's patent portfolio, and patent thicket a firm faces.

Patent Value

The second data source used in the analysis is a measure of the economic value of a patent. Assessing patent value is a challenging task, and scholars have used different approaches to estimate the value of patents as was briefly surveyed above. We use two measures of patent value: i) forward citations and ii) market reactions to patent announcements.

A patent's number of forward citations denotes the number of citations it has received by subsequent patents that cite it and has been commonly used as a proxy for the economic value of the patent (e.g., Trajtenberg, 1999; Harhoff, Narin, Scherer, and Vopel, 1999; Hall et al., 2005). It is worth noting that patent value and forward citations are two correlated yet distinct measures for the economic value of a patent. Patent renewal is another indicator of patent value because more valuable patents are more likely to be renewed (Schankerman, 1998). Moreover, patent litigation indicates patent value because more valuable patents are more likely litigated (Galasso and Schankerman, 2010). A critical limitation of forward citations and patent renewal is that they are ex post measures and cannot be observed by researchers immediately after a patent is granted (Kogan et al., 2017).

One recent approach that has been used by many follow-on studies and that does not suffer from this limitation is that used by Kogan et al (2017), who construct a measure of patent value by analyzing the market reaction around a patent announcement. The key idea behind the construction of their value measure is that holding all other factors constant, the change in market value around a public patent announcement should reveal the net present value (NPV) of the patent rights granted to the firm. The authors show that the measures of patent value that they generate using this method contain information that has explanatory power beyond other measures of patent impact, such as forward citations, patent renewal, and patent litigation, and that these measures are predictors of economic outcomes, such as future productivity.

Using these methods, the authors compute estimates of the economic value of thousands of patents, and these patent value estimates have been made available for research. For our analysis, we accessed this data from https:/fiu.app.box.com/v/patents on Jan. 20, 2020. The data set used in the initial published paper included patents from 1976 through 2010. This data set gives us a measure of the value of a patent drawn from one class of decision makers (i.e. investor reactions).

Overview of Approach

Our goal is to evaluate the extent to which deep learning and text processing can aid in the patent value prediction task. We first collect the information from all 1,335,177 patents granted to public firms in our sample period which spans the years 1976 to 2010. We drop variables with missing data and remove the top 1% by patent value (due to heavy skew), and we are left with 1,200,333 rows. We then randomly train-test split the data to obtain 1,110,333 patents to be used as the training sample and the remaining 90,000 to be used as the test sample. The mean patent value in our training sample is USD 9.46 million, and the mean patent value in the test sample is USD 9.53 million.

To provide consistent baselines throughout the analysis, we focus on three categories of models for performance comparison. For each, we convert patent values to logs and fit the logarithmic patent value to features in the training sample. Then, we use the trained model to predict the logarithmic patent value. The three classes of models we evaluate are described below:

1. First, we replicate models used in the existing literature on patent value. These principally rely on linear ordinary least squares (OLS) regressions using the structured numerical and categorical features in patent documents. This literature analyzes the economic value and technological merits of patents and can be traced back to the log-linearized production function of innovation used by Griliches (1981, 1988) and Kortum and Lemer (1998).
2. Second, we expand the class of models to supervised machine learning models, including both shallow and deep learning models, but continue to constrain our feature set to those derived from the structured patent data. These models include some that are non-parametric and that allow for interaction effects among the structured features, so although they use only structured data, they impose different tradeoffs than the linear regression-based models.
3. Third, we expand the feature set by using text and NLP methods in the deep learning models. When incorporating unstructured patent text, we take advantage of recent advances in multi-view (i.e., the ability to process multiple modalities, such as text and structured data) deep learning models augmented with pre-trained embedding models (e.g., GloVe, FastText), which are aware of semantic similarities and linguistic statistical structures and enable these models to better capture textual signals. This step is "supervised" (given data x and label y, find a function f such that f(x)=y) because the objective function is specified (market reaction or forward citations). Additionally, we also ran another supervised learning model that incorporates feature-engineered patent text to compare against deep learning models that incorporate textual data natively.

To assess the performance of each of these models when predicting patent value or impact (i.e. market value or forward citations), we use the mean absolute error (MAE) loss metric on a set of data set that was set aside for the performance measurement task. Mean absolute error is defined as the average absolute distance between each predicted patent value and its "true" value from the labels assigned by Kogan et al. (2017). Relative to other error metrics, such as mean squared error, MAE minimizes penalties imposed by outliers. Although this itself offers benefits due to the skewed nature of the patent data, we choose the mean absolute error metric because it is the most common loss metric used when evaluating deep learning models.

Main Results

The models used in this section, the rationale for the modeling choices we make, and the performance of each of the models are described in detail below. For convenience, they are also summarized in Table 1.

TABLE 1

| Summary of approaches and results | |
|---|---|
| Method | Mean Absolute Error (MAE) |
| Linear regression model | |
| Model (1): Patent characteristics, and class and year FE | 8.64 |
| Model (2): Patent characteristics and all FE | 7.58 |
| Model (3): Patent characteristics, firm characteristics, and all FE | 7.02 |
| Model (4): Patent characteristics, firm characteristics, and all FE | 5.95 |
| ML models using structured features | |
| Ridge regression | 4.40 |
| Random forest | 4.02 |
| XGBoost | 5.66 |
| FF Neural Net | 4.65 |
| Best text only model | 8.89 |
| Best all features + text model | 3.26 |

Table notes:

This table summarizes key models and results using data features derived from patent filings to predict patent values as measured in Kogan et al (2017). Patents covered in our sample include those granted to U.S. Public firms in 2003 to 2017. Detailed descriptions of these models and approaches are discussed in the subsequent sections.

TABLE 2

| Linear regression results with structured features in the training sample | | | | |
|---|---|---|---|---|
| Model | (1) | (2) | (3) | (4) |
| Observations | 930,618 | 911,838 | 828,058 | 827,668 |
| R-squared | 0.168 | 0.793 | 0.795 | 0.863 |
| Patent Characteristics | Yes | Yes | Yes | Yes |
| Firm characteristics | | | Yes | Yes |
| Grant year FE | Yes | Yes | Yes | Yes |
| Class (CPC) FE | Yes | Yes | Yes | Yes |
| Firm (PERMNO) FE | | Yes | | Yes |
| Industry FE | | Yes | | Yes |

Table notes:

This table reports linear regression results of patent features on patent value in the training sample. PERMNO indicates organization fixed-effects and they are included in columns 1, 2, and 3. Standard errors are shown in parentheses, ** p < 0.01,  p < 0.05, *p < 0.1

A. Linear Regression Model

Almost all of the literature to date has used structured patent features (e.g. originality, technological classification) to predict proxies of patent value, such as forward citations and patent renewal. One of the few exceptions is Kuhn and Thompson (2019) who use word counts in the first independent patent claim as an indicator of value. All of these models share a common goal of using linear regression models to estimate the importance of various structured patent features in predicting patent value.

The starting point of our analysis is to replicate common specifications from the patent valuation literature to demonstrate that the sample we use in the rest of our analysis behaves as expected, given what we know from prior work in this area. The first model we test follows Hall (1993) and Hall et al. (2005) and can be specified as:

$$\ln(Xi)=\alpha Zi+\beta Wj+\gamma j+\theta k+\delta t+\varepsilon i \quad (1)$$

We estimate equation (1) on the 669,759 patents in our training sample to obtain coefficients (including those on fixed effects included in the model). We then use these coefficient estimates to predict the value of the 118,192 patents in the test sample. In this specification, i indexes the patent granted in technology subsection k to firm j in year t, the dependent variable is the value of the patent denoted as $X_i$, $Z_i$ is a vector of structured patent features, $W_j$ is a vector of structured firm features, $\gamma_j$ is a vector of firm or industry fixed-effects (omitted from some models), $\theta_k$ is a vector of fixed-effects for technology subsections, $\delta_t$ is a vector of year fixed effects for the grant year, and $\varepsilon_i$ is the unmodeled error term. Each row in this regression corresponds to one patent.

Table 2 presents the results from estimating equation (1) using the training sample. In Model (1), we only consider patent characteristics including year fixed effects and subsection fixed effects (for technology classification) in Model (1). We find that the R-squared is 16.8%, suggesting that patent characteristics explain up to 17% of the total variation in patent value in the training sample. The MAE of Model (1) for the test sample, as shown in Table 1, is 8.64. It is noteworthy that we use logarithmic values as regression dependent variables, but then exponentiate each predicted value to convert back to a USD-denominated value; thus, the MAE of 8.64 suggests the predictions made by these two models can deviate from the real value by USD 8.64 million on average.

In Model (2), we consider four sets of fixed effects: year, subsection (for technology classification), firm (based on PERMNO), and industry fixed effects (based on Fama-French 48 industries). We find that the R-squared value of Model (2) is as high as 79.3%, suggesting that these features can explain variation in patent values in the training sample to a great extent. The R-squared value from this regression indicates that fixed-effects for the patenting organization matter a great deal for explaining patent value, and in fact can explain a significant amount of variation in investor reaction to patent announcements. The MAE of Model (2) in the test sample reaches a low of 7.58, which is much smaller than the MAE of Model (1). This result suggests that the identity of the organization filing the patent (captured by firm and industry fixed effects) plays an important role in predicting investor reaction to the patent. In addition, the predictions made by Model (2) can deviate from the real value by USD 7.58 million.

Lastly, in Model (3), we take an extensive list of firm characteristics into account. In Model (3), we only consider two sets of fixed effects: grant year fixed effects and subsection fixed effects (for technology classification). We find that the model delivers an R-squared of 83.6% in the training sample and MAE of 7.02 in the test sample. Model (4) is the full model—it includes all patent and firm characteristics and all four sets of fixed effects (year, subsection, firm, and industry fixed effects). It delivers an R-squared of 86.3% (which is the highest among all models) in the training sample and an MAE of 5.95 (which is the lowest of all models). This suggests that the prediction made by Model (4) can deviate from the real value by USD 5.95 million.

B. Machine Learning Models Using the Structured Feature Set

The next class of models we consider continues to use structured features from the patent data, but it also considers machine learning models. Specifically, we test the performance of the following models, which represent some of the most commonly used supervised models.

i) Ridge regression, ii) Random forest models, iii) Gradient boosted trees,

Given the use of structured information from the patent, the first three classes of models are straightforward to implement when using modem statistical packages.

Table 3 reports the results from using supervised learning models to predict patent value.

TABLE 3

Machine learning models using structured features

| Models | Ncites | Num claims | Pemno | App year | grant year | Class | Test R^2 | Test RMSE | Test MAE |
|---|---|---|---|---|---|---|---|---|---|
| Ridge | X | X | | | | | 0.00 | 16.68 | 8.91 |
| Ridge | X | X | | X | X | | 0.01 | 16.59 | 8.65 |
| Ridge | X | X | | X | X | X | 0.07 | 16.11 | 6.35 |
| Ridge | X | X | X | X | X | | 0.61 | 10.43 | 4.40 |
| RForest | X | X | | | | | 0.00 | 16.72 | 8.93 |
| RForest | X | X | | X | X | | 0.01 | 16.62 | 8.87 |
| RForest | X | X | | X | X | X | 0.03 | 17.86 | 8.98 |
| RForest | X | X | X | X | X | | 0.50 | 10.60 | 4.02 |
| XGBoost | X | X | | | | | 0.00 | 16.67 | 8.91 |
| XGBoost | X | X | | X | X | | 0.01 | 16.59 | 8.85 |
| XGBoost | X | X | | X | X | X | 0.05 | 16.30 | 8.44 |
| XGBoost | X | X | X | X | X | | 0.56 | 11.21 | 5.66 |
| FF Neural Net | X | X | | | | | 0.00 | 16.66 | 6.85 |
| FF Neural Net | X | X | | X | X | | 0.01 | 16.59 | 8.71 |
| FF Neural Net | X | X | | X | X | X | 0.06 | 16.25 | 8.49 |
| FF Neural Net | X | X | X | X | X | | 0.53 | 11.50 | 4.55 |

The first set of models use Ridge regression. Ridge regression models are a class of estimators that "shrink" outliers to the sample mean. They offer some potential advantages over the use of linear regression in a context such as this one, where the dependent variable, patent value, is highly skewed, and where there are a very large number of independent variables. Applying Ridge regression models appears to perform better at the prediction task than the linear regression models, particularly in the models that include firm fixed-effects and therefore have a large number of independent variables. The Ridge regression model with a full set of firm fixed-effects generates an MAE value of only about 4.4 in the test sample, which is a significant reduction when compared with the linear models that we have applied up to this point.

The next model for which we present results is a Random Forest (RForest) model, which is an ensemble learning technique known to perform well in a variety of applications, and works by constructing a number of different regression trees that fit the model and takes the mean of the predicted regression values outputted by the different models. In our patent-based application, as well, it appears that Random Forest works relatively well when compared to other models, with the model that includes firm fixed-effects producing an MAE value of 4.02 in the test sample, which is a lower error value than any of the models used so far, including the Ridge regression model.

The final two types of supervised machine learning models used for this application are XGBoost, another ensemble learning method which relies on Gradient boosting, and a Feed-forward Neural Network (FF Neural Network). With firm fixed-effects, these two models also perform better than linear regression but not as well as the Ridge regression model or the Random Forest models.

The key conclusion from this set of tests is that the performance of these supervised machine learning models is superior to linear regression. This is not surprising, as these models allow for interaction effects between variables (which we do not include in the linear models), and the non-parametric approaches may respond better to the distributional difficulties presented by skewed value data. Even without introducing text, some of the most commonly used supervised learning models reduce MAE by as much as 32%.

In the next section, we 1) apply deep learning methods and 2) add textual data to investigate how much further this MAE metric can be reduced.

C. Deep Learning Approaches

The deep learning, neural network-based models we use are constructed in the following way:

1. Structured and categorical features are mapped to vectors using an embedding layer for each feature of a specified size.

2. The embeddings generated for all of the categorical features and the numerical features are concatenated to produce a single vector for each patent.

3. This vector is then passed through a 3-layer perceptron of size 128 using a ReLU (Rectified Linear Unit) activation function to arrive at a combined representation.

4. To predict log(Xi+1), we use a linear layer which takes the combined representation and outputs a single scalar.

The steps described above are summarized in FIG. 1.

In Table 4, the first column indexes the model number, the second column indicates whether structured or structured plus text data has been used, the third column indicates how the patent data is converted to features, the fourth column describes the type of predictive model used in the test, and the fifth column reports the performance metric, which is the mean absolute error (MAE) of the model when it is run on the test sample.

TABLE 4

Deep learning models with and without NLP

| 1 No. | 2 Features | 3 Variables and data processing method | 4 Model description | 5 Test Set MAE |
|---|---|---|---|---|
| 1 | structured | Embed categorical features | 1 dense layer, 1 output single neuron | 5.98 |
| 2 | structured | Embed categorical features; top 1% value removed (outliers) | 1 dense layer, 1 output single neuron | 4.08 |
| 3 | brief summary | Embedding the first 3000 tokens of brief summary using GLoVe Embedding after removing stop words | 3 CNN layers, 1 bidirectional LSTM layer, 1 dense layer, 1 output single neuron | 8.89 |
| 4 | claims | Embedding the first 3000 tokens of claims using GLoVe Embedding after removing stop words | Same as above | 9.64 |
| 5 | brief summary | Embedding the first 3000 tokens of brief summary using GLoVe Embedding after removing stop words; top 1% values removed (outliers) | Same as above | 6.86 |
| 6 | claims | Embedding the first 3000 tokens of claims using GLoVe Embedding after removing stop words; top 1% values removed (outliers) | Same as above | 7.11 |
| 7 | brief summary + structured | Embed categorical features; Embedding the first 3000 tokens of brief summary using GLoVe Embedding after removing stop words | Text input only: 3 CNN layers, 1 bidirectional LSTM layer, 1 dense layer; Structured input only: 1 dense layer. Concatenate the two output to feed 1 output single neuron | 4.7 |
| 8 | brief summary + structured | Embed categorical features; Embedding the first 300 tokens of brief summary using GLoVe Embedding after removing stop words; top 1% values removed (outliers) | Same as above | 3.37 |

TABLE 4-continued

Deep learning models with and without NLP

| 1 No. | 2 Features | 3 Variables and data processing method | 4 Model description | 5 Test Set MAE |
|---|---|---|---|---|
| 9 | brief summary + structured | Embed categorical features; Embedding the first 3000 tokens of brief summary using GLoVe Embedding after removing stop words; top 1% values removed (outliers) | Same as above | 3.26 |
| 10 | claims + structured | Embed categorical features; Embedding the first 3000 tokens of claims using fastText Embedding after removing stop words; top 1% value removed (outliers) | Same as above | 3.62 |
| 11 | brief summary + claims + structured | Embed categorical features; Embedding the first 3000 tokens of claims and brief summary using fastText Embedding after removing stop words; Embedding after removing stop words; top 1% value removed (outliers) | Same as above | 3.49 |
| 12 | claims + structured | Remove stopwords and special characters, weigh claims unigrams by TF-IDF and take the top 500 along with top 500 bigrams | XGBoost | 5.25 |
| 13 | brief summary + structured | Remove stopwords and special characters, weigh brief summary unigrams by TF-IDF and take the top 500 along with | XGBoost | 5.32 |

TABLE 4-continued

| Deep learning models with and without NLP | | | | |
|---|---|---|---|---|
| 1 No. | 2 Features | 3 Variables and data processing method | 4 Model description | 5 Test Set MAE |
| | | top 500 bigrams | | |

Table notes:
for all rows, training sample size is 1 million and test sample size is 100,000

A modeling choice we face when introducing text into our models is which section of the patent text to focus on. Patent documents are characterized by a number of different sections of text—abstract, claims, summary—and they can differ in terms of the types of language they contain and in their relative importance to the protection claim.

First, we use only the brief summary descriptions, with stop words removed and with the length of the text capped at 3,000 words. On average, a brief summary description had 855 words after removing stop words with a standard deviation of 1,094. At the 99th percentile, there were 4,740 words after removing stop words. To generate the text only model, we take the following steps:

1. First, we create a vocabulary of tokens that appear at least ten times each in the training corpus. In other words, tokens that appear nine times or less across the entire corpus (and are therefore likely to be unique to a single filing or small group of filings) are not included in the training set. For these other tokens (those that appear less than ten times), we create a special <UNK> token. All words are initialized with their GLoVe vector if available. GLoVe is a vector-based representation of words that retains semantic-similarity information suitable for using deep learning approaches on text (for background on GloVe vectors, see Pennington et al 2014). Otherwise, words are initialized with random values. These word embeddings are trainable and have one hundred dimensions.
2. A dropout value of 0.50 is applied to each of the word embeddings. Dropouts are a method wherein some subset of nodes in a neural network is ignored during passes through the training phase, thereby mitigating problems related to overfitting.
3. Three convolutional neural net (CNN) layers, with 100 filters each, and with kernel sizes of 2, 3, and 4 are applied in parallel, and their outputs are concatenated at each time step.
4. A MaxPool layer of kernel size 3 and stride 2 is used to reduce the number of time steps.
5. A bidirectional long short-term memory (LSTM) network with a hidden-size of 256 processes the output of these prior stages, and we use the output hidden state of the LSTM at the final time step. LSTM structure is responsible for remembering and keeping track of local-level features extracted by CNN layers throughout long text.
6. A multi-layer perceptron (dense) layer of size 256 with a ReLU (Rectified Linear Unit) activation function is used on top of the LSTM output to produce a final text representation.
7. Finally, to predict log(Xi+1), we use an additional linear layer which takes the text representation as input and outputs a single scalar.

Figure 2:
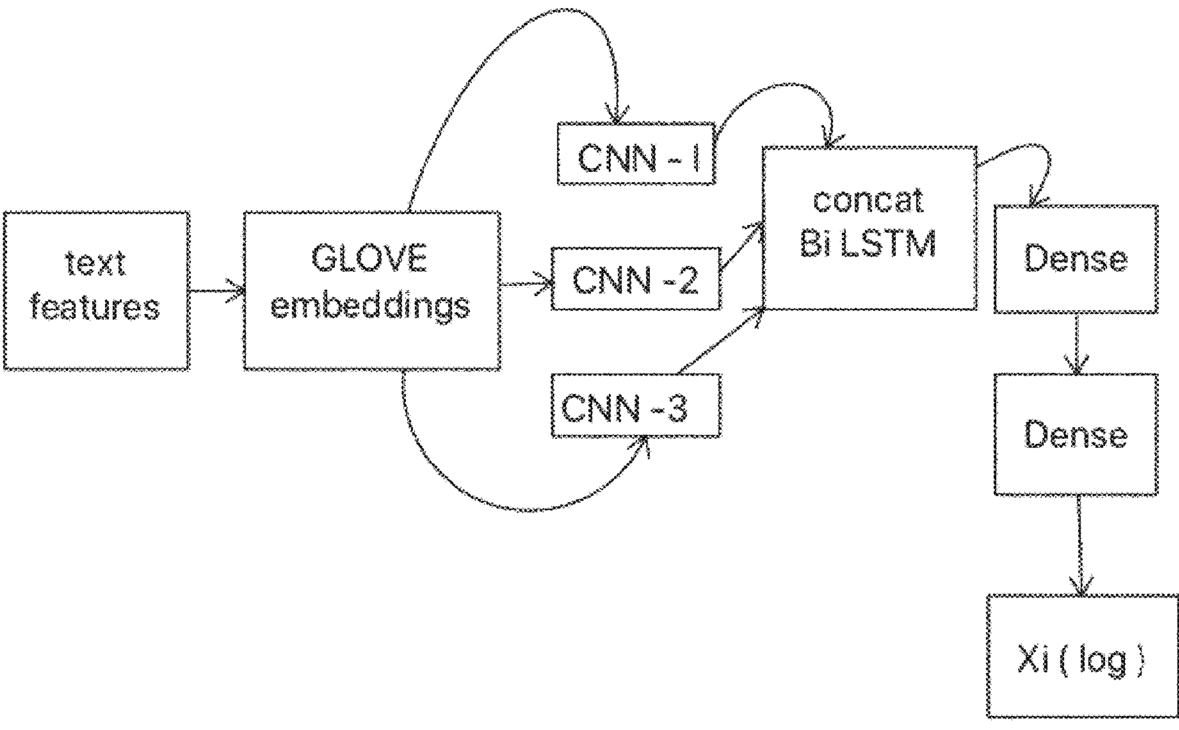
FIG. 2 is a block diagram illustrating an example method for generating a text only model.

Steps for the text-only model are summarized in FIG. 2.

Figure 3:
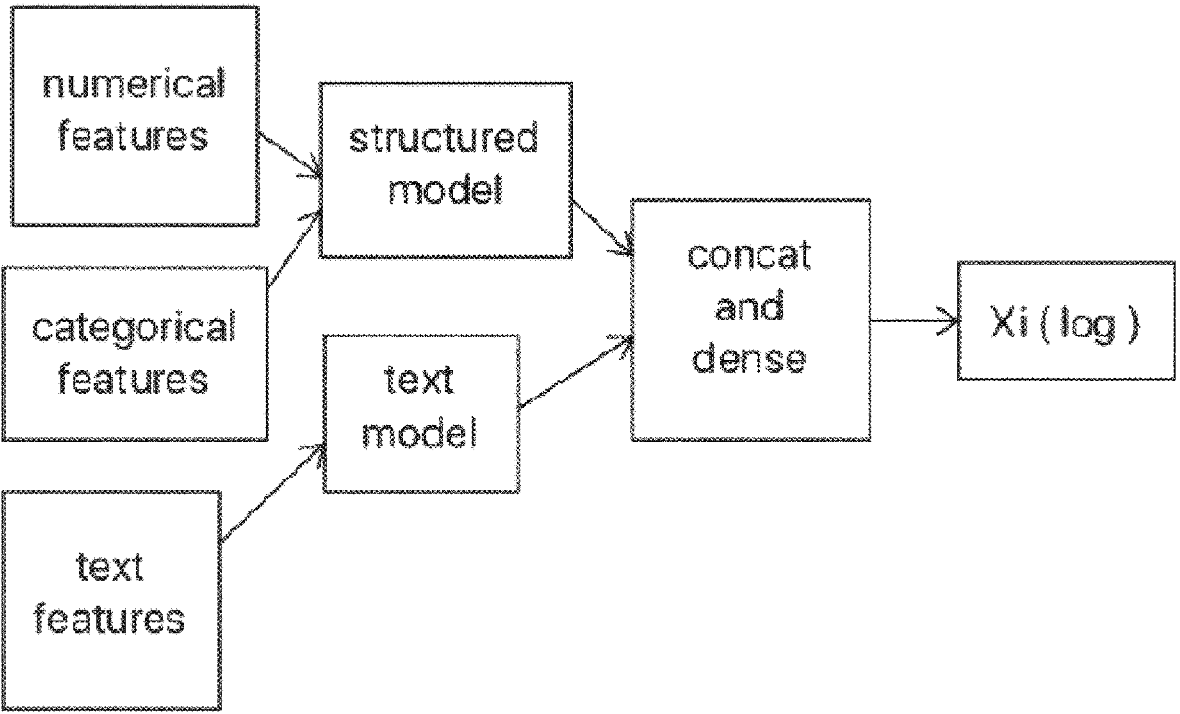
FIG. 3 is a block diagram illustrating an example method for generating a model using text and structured features of the patent.

We test the performance of models that use only the text content of the patent documents, as well as in conjunction with the structured features already discussed above. The model that incorporates both patent text and structured features works like the above model for the structured data and text data independently, up until the last dense layer. The difference is that the text representation and the numerical+categorical representation are concatenated with one another into a vector and then log (Xi+1) is generated. This model, using text and structured features of the patent, is summarized in FIG. 3. Lastly, we also run XGBoost, a widely used top-performing algorithm, along with manual feature-engineered text variables, such as bigrams and TF-IDF (term frequency-inverse document frequency) weighted unigrams, to compare against deep learning models that utilize both structured and text data.

The first row in Table 4 only uses structured features. We do not remove the top 1% patent value. Using neural networks with the structured features while retaining firm fixed-effects produces a large drop in the MAE metric. The MAE falls to 5.98 in the test sample. The key difference between this neural network model and the linear regressions used is that the neural network is not restricted to a linear combination of model features. It can generate new features based on non-linear interactions between the existing features in the model. In the second row in Table 4, we use the same neural network method but remove the top 1% patent value. We find that the MAE drops to 4.08 in the test sample, which is as low as the MAE of the best model in Table 3 and is much smaller than the MAE of the best linear regression model (5.95).

Row 3 onwards in Table 4 begins to introduce textual data into the analysis, and it uses a neural network to use text input with or without structured data to predict patent value. We first introduce text from the patent brief summary, which is the section of the document intended to be a brief description of the invention. Therefore, the summary section of the patent document should encapsulate many of the key differentiating features of the invention. We also utilize claims text. The claims text from a patent filing, in contrast to the summary, describes the scope of the technical protection granted by the patent. To convert the text content of the summary into features for the neural network-based model, "stop words" are removed from the summary text using the spaCy library. This is a pre-fixed set of common words, with little information content, that are not used by the predictive algorithm. Then, we restrict the text processing model to the first 3,000 tokens (i.e. words) after removing stop words and representing each word with either GloVe or Fasttext embedding.

Rows 3-6 present models using only textual features (brief summary or claims), and the MAE rises back up to the range of 6.86-9.64 depending on modeling choice. There is a significant loss of information when using text-only models. The results suggest that, for this data, the brief summary seems to have higher signal compared to the claims text in predicting the output value. We speculate that this is due to the nature of output value relying on short-term market reactions and the nature of brief summary content which may include contemporaneous or contextual information. In addition, while claims have legal implications, their information may not be as technology-relevant as that contained in the brief summary. Removing top 1% by value also helps with performance.

Rows 7-10 present models using both structured data and text data. Model 9, which uses the FastText embedding of brief summary text along with a CNN-LSTM neural net achieves the best MAE of 3.26 (Row 9). FastText (Bojanowski et al., 2017) is another word embedding technique that processes words at the character level and is thus more efficient. This suggests that text does introduce new information; using both the structured features and the patent text together is a more accurate predictive model than using either of these alone. In these models, the brief summary seems to carry more informative signals again. When adding both brief summary and claims text, the model seems to get confused due to noise, which might be overcome with extensive fine tuning.

Lastly, rows 12 and 13 use XGBoost along with feature-engineered textual attributes to benchmark against the deep learning models that can natively handle both structured and text data. MAE performance is at 5.25 and 5.32, coming short of deep learning approaches.

The best performing model in this table is in Row 9, which uses both the categorical structured features that have been used in many patent value studies and introduces the text from the summary document. We conjecture that contextualized embedding models (e.g., BERT by Devlin et al 2018 or ELMO by Peters et al 2018) that can learn more specific linguistic structures of patent text may be applied to increase performance even further.

A second takeaway from this set of tests is that text is informative when predicting patent-based outcome features, such as value. Using structured features remains critical and provides a great deal of predictive information. The summary text, which briefly outlines the subject matter of the patent and may therefore contain the highest density of keywords, has superior predictive power compared to the claims text.

Application to Forward Citations

The majority of prior studies on patent value rely on the number of forward citations received (Office of Technology Assessment and Forecast, 1976; Trajtenberg, 1990; Harhoff, Narin, Scherer, and Vopel, 1999). It is an important and meaningful extension to apply our methods and comparisons to the number of forward citations. We first calculate the number of three-year forward citations of all patents in our sample. We use the sample period 2003 to 2017. We then use the logarithmic value of the forward citations plus one as the dependent variable in Equation (1) and re-estimate the best linear model (i.e., Model (6) in Table 1) to train the model using the training sample. Similar to our earlier exercise, we then use the out-of-sample set to calculate the MAE between the predicted value and real value of forward citations. We find that the linear regression delivers an MAE of 1.74 (shown in Table 5), suggesting that the prediction deviates from the actual forward citations by 1.74 citations.

TABLE 5

Summary of results for forward citations

| Method | Mean Absolute Error (MAE) |
|---|---|
| Linear Regression Model: Patent characteristics, firm characteristics, and all FE | 1.736 |
| Multi-layered Perceptron Neural Net: Using structured data only | 1.604 |
| Neural Network Model: Structured Data and Claims Text | 1.613 |

Table notes:
This table summarizes key models and results using data features derived from patent filings to predict the number for forward citations. Patents covered in our sample include those granted to U.S. public firms in 2003 to 2017.

Using neural networks rather than linear regression for this task-along with only the structured data-only slightly lowers this number, such that the deviation in the prediction of forward citations falls to about 1.6, which is an 8% improvement.

The prediction results from incorporating the patent text along with the structured features fall in between the two. The MAE from using these inputs into a neural network model is 1.61. As we have seen in the case of adding both claims and brief summary reducing performance due to noise, we see again that adding structured data and claims text performed slightly worse than using just structured data.

These results indicate that the deep-learning methods perform slightly better in forecasting forward citations in comparison with traditional regression estimations, but the improvement is not as large as it is when predicting value. Nevertheless, this finding highlights the possibility of applying our methods to other non-pecuniary measures of the effects of patentable innovations.

In addition, to reflect the fact that a large portion of patents do not receive forward citations, we present histograms for the distribution of forward citations and the predicted values of three methods (linear regressions, neural networks without patent text, and neural networks with patent text) in FIG. 4. We find that 45% of patents receive zero forward citations. The mass of zeros cannot be matched by linear regressions and neural networks without patent text but can be well matched by neural networks with patent text (which predicts 43% of zero forward citations). In fact, when a patent's forward citation count is zero, using the neural networks with the patent text method can correctly predict zero with a probability of 46%. This supports the information advantage of patent text from a new perspective.

Application to Patents from Non-Listed Firms

We would like to investigate whether our prediction models perform well in a context in which there may be comparatively less information about patent value. Ideally, we would investigate patent values in privately-held firms, but unfortunately, our ability to train the prediction models on "ground truth" patent valuations is limited to contexts which are likely severely selected (e.g. patent litigation or licensing). We thus extend our analysis to focus on firms that are newly-public because an objective benchmark, market reaction, is available to us for these patents. Another motivation is to test the extent to which our main results might be driven by established firms, some of which receive hundreds or thousands of patents per year. We evaluate how the deep learning methods described above compare against existing statistical methods.

We first train our regression and deep-learning methods using all patents granted to firms that had not recently gone public in a recent sample period (2003-2017). We then use the trained model to predict the values of patents assigned to newly public firms. We define whether a patent is from a newly public firm in two different ways: 1) whether its grant date is within a two-year window from the firm's IPO date, or 2) whether the patent grant date is within a slightly broader three-year window from the firm's IPO date. Similar to our earlier analysis, we truncate patents in the top 1% of patent value.

When we apply the trained models to predict patent values, we find that the regression model delivers MAE values of 20.10 and 19.61 for the two- and three-year IPO windows, respectively (the first row in two panels of Table 6). These numbers are higher than the MAE of 8.64 of Model (1) in Table 1 for all public firms' patents, which is reasonable because the patents of newly IPOed firms are likely different from those of established firms.

TABLE 6

Summary of results for patents from firms that have recently IPOed

Panel A: Patents granted within 2 years of the IPO date

| Method | Mean Absolute Error (MAE) |
|---|---|
| Linear Regression Model: Patent characteristics, and class and year FE | 20.10 |
| Multi-layered Perceptron Neural Net: Using structured data only | 14.62 |
| Neural Network Model: Structured Data and Claims Text | 10.58 |

Panel B: Patents granted within 3 years of the IPO date

| Method | Mean Absolute Error (MAE) |
|---|---|
| Linear Regression Model: Patent characteristics, and class and year FE | 19.61 |
| Multi-layered Perceptron Neural Net: Using structured data only | 16.13 |
| Neural Network Model: Structured Data and Claims Text | 12.89 |

Table notes:
This table summarizes key models and results using data features derived from patent filings to predict the value of newly IPO firms' patents. Patents covered in our sample include those granted to U.S. public firms in 2003 to 2017.

The next two rows in Panel A of Table 6 show the results from applying a deep learning approach to the patent document information from this sample of firms. When using deep learning along with only the structured features, the MAE drops to about 14.62. Incorporating text further lowers the MAE value to about 10.58. By way of comparison, this is better than linear regression models for established firms when using no firm information, but it is not as effective as using firm information (such as Model (4) in Table 1). The same pattern is found in Panel B of Table 6.

The analyses we perform in this subsection are notable for the following reasons: first, we demonstrate the possibility of applying our methods to entities that are not publicly listed, such as private firms, universities, and research labs. Second, we provide further evidence for the importance of text-based information and deep-learning methods in predicting patent value. Finally, we observe much less accurate predictions of patent values when we do not utilize firm-level information, which supports a long belief in the literature: the private values of a patent depend on the synergies from all functions of an organization/firm. It is thus very important for researchers to collect firm-related information when they attempt to evaluate patent value.

CONCLUSIONS

Our study evaluates the application of deep learning to patent text to predict patent value as measured by either forward citations or computed using market reactions to patent announcements. Valuing patents is important for a number of reasons, ranging from understanding the value of a firm's assets to understanding investment decisions as well as aggregate innovation rates and directions in different economic sectors and regions. There has been substantial academic interest in predicting the impact of innovation from patent information, and the results presented in this paper suggest that incorporating text into the statistical methods most frequently used to predict patent value substantially improves predictive power. Specifically, applying deep learning to patent text improves our ability to predict patent value by about 60% relative to a baseline that uses only structured features with linear regression models. About two-thirds of this improvement comes from the application of deep learning, and the remaining third from using the patent text.

This research is intended to bridge a quickly expanding body of literature on text analysis methods for social science research with a large and established body of literature on patents and innovation. Due in part to the rich and extensive data on patent filings and grants, patents have been used to answer dozens of questions related to innovation, corporate strategy, geography, and investment. This document contributes to an emerging body of literature suggesting that the text content of patent documents, which has largely been absent from these lines of patent-based inquiry thus far, can make valuable contributions to our understanding of patents and innovation, and perhaps open up some new areas of research.

Figure 5:
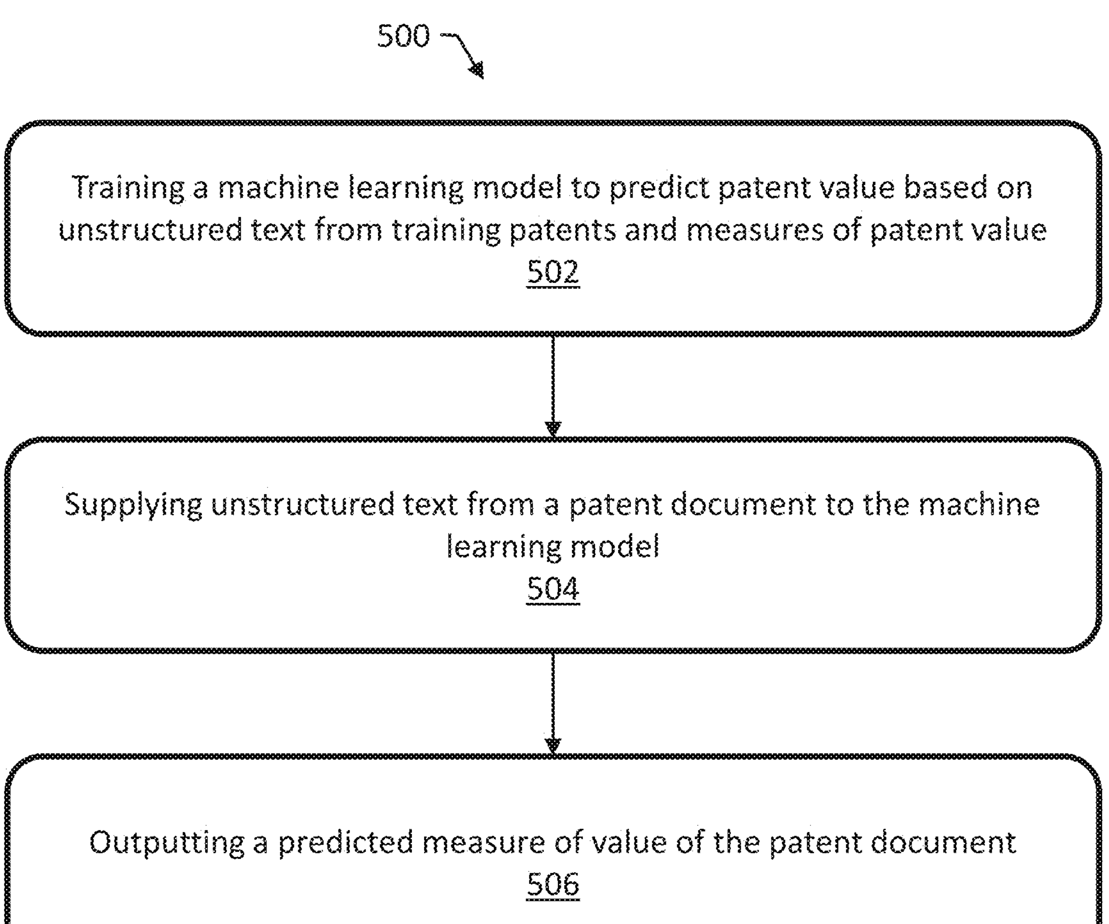
FIG. 5 is a flow chart of an example method for patent valuation using machine learning.

FIG. 5 is a flow diagram of an example method 500 for patent valuation using machine learning.

The method 500 includes training, by at least one processor, a machine learning model to predict patent value based on unstructured text from a plurality of training patents and, for each training patent, a measure of patent value (502). Training the machine learning model can include determining the measure of patent value for each training patent based on one or more market reactions to firm patent grants. Training the machine learning model can include further training the machine learning model using structured data from the training patents. In some examples, the machine learning model is a deep learning model configured to use natural language processing on the unstructured text.

In some examples, the machine learning model comprises a plurality of convolutional neural network (CNN) layers. For instance, the machine learning model can be a bidirectional long short-term memory (LSTM) network configured for tracking local-level features extracted by the CNN layers. The machine learning model can have a multi-layer perceptron layer with an activation function to produce a final patent representation from the bidirectional LSTM network.

The method 500 includes supplying, by the at least one processor, unstructured text from a patent document to the machine learning model (504). The patent document can be, for example, a patent, patent application, or patent application publication.

The method 500 includes outputting, by the at least one processor, a predicted measure of value of the patent document (506). The predicted measure of value of the patent document can be a predicted measure of economic value to be assigned to the patent document by a market for patents or firms. The predicted measure of value of the patent document can be a predicted number of forward citations for the patent document.

Figure 6:
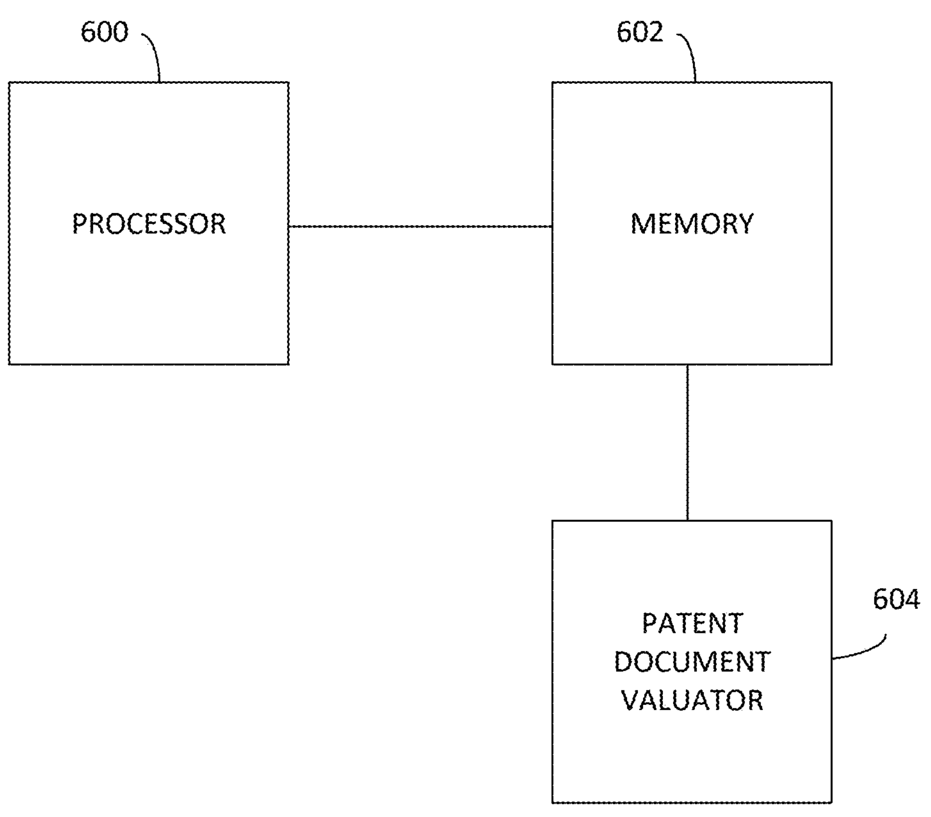
FIG. 6 is a block diagram illustrating an exemplary system for patent document valuation.

FIG. 6 is a block diagram illustrating an exemplary system for patent document valuation. Referring to FIG. 6, the system includes at least one processor 600 and a memory 602. The system further includes a patent document valuator 604. Patent document valuator 604 may perform the steps described herein for patent document valuation. Patent document valuator 604 may be implemented using computer executable instructions stored in memory 602 and executed by processor 600.

REFERENCES

Each of the following references is hereby incorporated by reference in its entirety.

Abrams, D. S., Akcigit, U., & Grennan, J. (2013). *Patent value and citations: Creative destruction or strategic disruption*? (No. w19647). National Bureau of Economic Research.

Azoulay, P., Ding, W., & Stuart, T. (2007). The determinants of faculty patenting behavior Demographics or opportunities?. *Journal of Economic Behavior & Organization,* 63(4), 599-623.

Bessen, J. (2008). The value of US patents by owner and patent characteristics. *Research Policy,* 3 7(5), 932-945.

Bojanowski, P., Grave, E., Joulin, A., & Mikolov, T. (2017). Enriching word vectors with subword information. *Transactions of the Association for Computational Linguistics,* 5, 135-146.

Cockburn, I., & Griliches, Z. (1988). Industry Effects and Appropriability Measures in the Stock Market's Valuation of R&D and Patents. *The American Economic Review,* 78(2), 419-423.

Cohen, W. (2010). "Fifty years of empirical studies of innovative activity and performance," in Handbook of the Economics of Innovation Vol. 1. B. H. Hall and N. Rosenberg, eds., pp. 129-213.

Deng, Z., Lev, B., & Narin, F. (1999). Science and technology as predictors of stock performance. *Financial Analysts Journal,* 55(3), 20-32.

Devlin, J., Chang, M. W., Lee, K., & Toutanova, K. (2018). Bert: Pre-training of deep bidirectional transformers for language understanding. arXiv preprint arXiv: 1810.04805.

Einav, L., & Levin, J. (2014). Economics in the age of big data. *Science,* 3 46(6210), 1243089.

Fitzgerald, T., Balsmeier, B., Fleming, L., & Manso, G. (2019). Innovation search strategy and predictable returns. *Management Science*, forthcoming.

Galasso, A., & Schankerman, M. (2010). Patent thickets, courts, and the market for innovation. *The RAND Journal of Economics,* 41(3), 472-503.

Galasso, A., Schankerman, M., & Serrano C. J. (2013). Trading and enforcing patent rights. *The RAND Journal of Economics,* 44(2), 275-312.

Gentzkow, M., Kelly, B., & Taddy, M. (2019). Text as data. *Journal of Economic Literature.* 5 7(3), 535-74.

Griliches, Z. (1981). Market value, R & D, and patents. *Economics Letters,* 7, 183-167.

Griliches, Z. (1998). Patent statistics as economic indicators: A survey. In R &D and Productivity: The Econometric Evidence, Z. Griliches, editor, University of Chicago Press, 287-343.

Gentzkow, M., Shapiro, J. M., & Taddy, M. (2019). Measuring Group Differences in High-Dimensional Choices: Method and Application to Congressional Speech. E conometrica, 87(4), 1307-1340.

Guellec, D., & de I a Potterie, B. V. P. (2000). Applications, grants and the value of patent. *Economics letters,* 6 9(1), 109-114.

Hall. B. H., Jaffe, A. B., & Trajtenberg, M. (2001). *The NBER patent citation data file: Lessons, insights and methodological tools* (No. w8498). National Bureau of Economic Research.

Hall, B. H., Jaffe, A., & Trajtenberg, M. (2005). Market value and patent citations. RAND *Journal of economics,* 16-38.

Hansen, S., McMahon, M., & Prat, A. (2018). Transparency and deliberation within the FOMC: a computational linguistics approach. *The Quarterly Journal of Economics,* 1 33(2), 801-870.

Harhoff, D., Narin, F., Scherer, F. M., & Vopel, K. (1999). Citation frequency and the value of patented inventions. *Review of Economics and Statistics,* 8 1(3), 511-515.

Harhoff, D., Scherer, F. M., Vopel, K. (2003). Citations, family size, opposition and the value of patent rights. *Research Policy,* 32(8): 1343-1363.

Hasan, M. A., Spangler, W. S., Griffin, T., & Alba, A. (2009, June). Coa: Finding novel patents through text analysis. In *Proceedings of the 15th ACM S/GKDD international conference on Knowledge discovery and data mining* (pp. 1175-1184).

Hirshleifer, D., Hsu, P. H., & Li, D. (2013). Innovative efficiency and stock returns. *Journal of Financial Economics,* 107(3), 632-654.

Hirshleifer. D., Hsu, P. H., & Li, D. (2018). Innovative originality, profitability, and stock returns. *The Review of Financial Studies,* 31(7), 2553-2605.

Jaffe, A. B., Trajtenberg, M., Henderson, R. (1993). Geographic localization of knowledge spillovers as evidenced by patent citations, *Quarterly Journal of Economics,* 108(3), 577-598.

Kamien, M. I. & Schwartz, N. L. (1975). Market structure and innovation: A survey. Journal of Economic Literature 13, 1-37.

Kelly, B., Papanikolaou, D., Seru, A., & Taddy, M. (forthcoming). Measuring technological innovation over the long run. American Economic Review Insights.

Kogan, L., Papanikolaou, D., Seru, A., & Stoffman, N. (2017). Technological innovation, resource allocation, and growth. *The Quarterly Journal of Economics,* 1 32(2), 665-712.

Kuhn, J. M. & Thompson, N. C. (2019). How to measure and draw causal inferences with patent scope. *International Journal of the Economics of Business.* 26(1), 5-38.

Lach, S., & Schankerman, M. (2008). Incentives and inventions in universities. *The RAND Journal of Economics,* 39(2), 403-433.

Lanjouw, J. O. (1998). Patent protection in the shadow of infringement: Simulation estimations of patent value. *The Review of Economic Studies,* 65(4), 671-710.

Lanjouw, J. O., Pakes, A., Putnam, J. (1998). How to count patents and value intellectual property: the uses of patent renewal and application data. *Journal of Industrial Economics.* 46(4), 405-432.

Lemer, J. (1994). The importance of patent scope: an empirical analysis. *The RAND Journal of Economics.* 319-333.

Li, G. C., Lai, R., D'Amour, A., Doolin, D. M., Sun, Y., Torvik, V. I., . . . & Fleming. L. (2014). Disambiguation and co-authorship networks of the US patent inventor database (1975-2010). *Research Policy,* 43(6), 941-955.

Marco, A. C., Myers, A., Graham, S. J., D'Agostino, P., & Apple, K. (2015). The USPTO patent assignment dataset: Descriptions and analysis.

Pakes, A. (1985). On patents, R & D, and the stock market rate of return. *Journal of Political Economy,* 93(2), 390-409.

Peters, M. E., Neumann, M., Iyyer, M., Gardner, M., Clark, C., Lee, K., & Zettlemoyer, L. (2018). Deep contextualized word representations. arXiv preprint arXiv: 1802.05365.

Pennington, J., Socher, R., & Manning, C. (2014, October). Glove: Global vectors for word representation. In *Proceedings of the* 2014 *conference on empirical methods in natural language processing* (*EMNLP*) (pp. 1532-1543).

Raymond, L., Stem, S. (2019). Predicting patent impact: A machine learning approach" working paper.

Reitzig, M. (2003). What determines patent value?: Insights from the 50 semiconductor industry. *Research Policy,* 3 2(1), 13-26.

Rücklé, A., Eger, S., Peyrard, M., & Gurevych, I. (2018). Concatenated power mean word embeddings as universal cross-lingual sentence representations. a *rXIv preprint arXiv:* 1803.01400.

Sampat, B. N., & Ziedonis, A. A. (2004). Patent citations and the economic value of patents. In Handbook of quantitative science and technology research (pp. 277-298). Springer, Dordrecht.

Schankerman, M. (1998). How valuable is patent protection? Estimates by technology field. *The RAND Journal of Economics,* 29(1), 77-107.

Trajtenberg, M. (1990). A penny for your quotes: patent citations and the value of innovations. *The Rand Journal of Economics,* 21(1), 172-187.

Thursby, J. G., & Kemp, S. (2002). Growth and productive efficiency of university intellectual property licensing. *Research Policy,* 31(1), 109-124.

Thursby, J. G., & Thursby, M. C. (2002). Who is selling the ivory tower? Sources of growth in university licensing. *Management Science,* 48(1), 90-104.

Van Zeebroeck, N. (2011). The puzzle of patent value indicators. *Economics of innovation and new technology,* 2 0(1), 33-62.

Van Zeebroeck, N., & Van Pottelsberghe de Ia Potterie, B. (2011). The vulnerability of patent value determinants. *Economics of innovation and new technology,* 20(3), 283-308.

Ziedonis, R. H. (2004). Don't fence me in: Fragmented markets for technology and the patent acquisition strategies of firms. *Management Science,* 50(6), 804-820.

What is claimed is:

1. A method comprising:

training, by at least one processor, a machine learning model to predict patent value based on unstructured text from a plurality of training patents and, for each training patent, a measure of patent value, wherein training the machine learning model includes creating a vocabulary of tokens corresponding to words that appear at least a predetermined number of times in the training patents, creating, using a pretrained embedding model and for a predetermined number of the tokens created from the summary section of each of the training patents, word embeddings for the summary section of each of the training patents and providing the word embeddings for the summary section of each of the training patents as input to the machine learning model, wherein the machine learning model comprises a plurality of convolutional neural network (CNN) layers, the machine learning model comprises a bidirectional long short-term memory (LSTM) network configured for tracking local-level features extracted by the CNN layers, and the machine learning model comprises a multi-layer perceptron layer with an activation function to produce a final patent representation from the bidirectional LSTM network;

supplying, by the at least one processor and to the machine learning model, unstructured text from a summary section of a patent document; and outputting, by the at least one processor, a predicted measure of value of the patent document.

2. The method of claim 1, wherein training the machine learning model comprises determining the measure of patent value for each training patent based on one or more market reactions to firm patent grants.

3. The method of claim 1, wherein the predicted measure of value of the patent document is a predicted measure of economic value to be assigned to the patent document by a market for patents or firms.

4. The method of claim 1, wherein the predicted measure of value of the patent document is a predicted number of forward citations for the patent document.

5. The method of claim 1, wherein the machine learning model is a deep learning model configured to use natural language processing on the unstructured text.

6. The method of claim 1, wherein the patent document comprises a patent, patent application, or patent application publication.

7. The method of claim 1, wherein training the machine learning model comprises further training the machine learning model using structured data from the training patents.

8. A system comprising:

at least one processor; and a machine learning model implemented and trained by the at least one processor to predict patent value based on unstructured text from a plurality of training patents and, for each training patent, a measure of patent value, wherein training the machine learning model includes creating a vocabulary of tokens corresponding to words that appear at least a predetermined number of times in a summary section of each of the training patents, creating, using a pretrained embedding model and for a predetermined number of the tokens created from the summary section of each of the training patents, word embeddings for the summary section of each of the training patents and providing the word embeddings for the summary section of each of the training patents as input to the machine learning model, wherein the machine learning model comprises a plurality of convolutional neural network (CNN) layers, the machine learning model comprises a bidirectional long short-term memory (LSTM) network configured for tracking local-level features extracted by the CNN layers, and the machine learning model comprises a multi-layer perceptron layer with an activation function to produce a final patent representation from the bidirectional LSTM network;

the machine learning model being supplied, by the at least one processor, with unstructured text from a summary section of a patent document to and outputting a predicted measure of value of the patent document.

9. The system of claim 8, wherein training the machine learning model comprises determining the measure of patent value for each training patent based on one or more market reactions to firm patent grants.

10. The system of claim 8, wherein the predicted measure of value of the patent document is a predicted measure of economic value to be assigned to the patent document by a market for patents or firms.

11. The system of claim 8, wherein the predicted measure of value of the patent document is a predicted number of forward citations for the patent document.

12. The system of claim 8, wherein the machine learning model is a deep learning model configured to use natural language processing on the unstructured text.

13. The system of claim 8, wherein training the machine learning model comprises further training the machine learning model using structured data from the training patents.

14. A non-transitory computer readable medium having stored thereon executable instructions hat when executed by a processor of a computer controls the computer to perform steps comprising training, by the at least one processor, a machine learning model to predict patent value based on unstructured text from a plurality of training patents and, for each training patent, a measure of patent value, wherein training the machine learning model includes creating a vocabulary of tokens corresponding to words that appear at least a predetermined number of times in a summary section of each of the training patents, creating, using a pretrained embedding model and for a predetermined number of the tokens created from the summary section of each of the training patents, word embeddings for the summary section of each of the training patents, and providing the v word embeddings for the summary section of each of the training patents as input to the machine learning model, wherein the machine learning model comprises a plurality of convolutional neural network (CNN) layers, the machine learning model comprises a bidirectional long short-term memory (LSTM) network configured for tracking local-level features extracted by the CNN layers, and the machine learning model comprises a multi-layer perceptron layer with an activation function to produce a final patent representation from the bidirectional LSTM network;

supplying, by at least one processor and to the machine learning model, unstructured text from a summary section of a patent document; and outputting, by the at least one processor, a predicted measure of value of the patent document.

* * * * *